US012213609B2

(12) United States Patent
Carr

(10) Patent No.: US 12,213,609 B2
(45) Date of Patent: Feb. 4, 2025

(54) DELIVERY SYSTEM AND METHOD

(71) Applicant: Brian Carr, Mainville, OH (US)

(72) Inventor: Brian Carr, Mainville, OH (US)

(*) Notice: Subject to any disclaimer, the term of this patent is extended or adjusted under 35 U.S.C. 154(b) by 51 days.

(21) Appl. No.: 17/862,262

(22) Filed: Jul. 11, 2022

(65) Prior Publication Data
US 2023/0044060 A1    Feb. 9, 2023

Related U.S. Application Data

(60) Provisional application No. 63/220,334, filed on Jul. 9, 2021.

(51) Int. Cl.
A47G 29/22    (2006.01)
A47G 29/14    (2006.01)
A47G 29/30    (2006.01)
B64C 39/02    (2023.01)

(52) U.S. Cl.
CPC .......... A47G 29/22 (2013.01); A47G 29/141 (2013.01); A47G 29/30 (2013.01); B64C 39/024 (2013.01)

(58) Field of Classification Search
CPC ...... A47G 29/22; A47G 29/141; A47G 29/30; A47G 2029/145; A47G 2029/149; G06Q 10/0836; B64U 2101/64; B64U 2101/66; B64D 1/02; B64F 1/32; B64C 39/024
See application file for complete search history.

(56) References Cited

U.S. PATENT DOCUMENTS

| | | | |
|---|---|---|---|
| 7,925,375 B2 * | 4/2011 | Schininger | G07F 11/54 700/214 |
| 8,145,351 B2 * | 3/2012 | Schininger | G07F 9/009 221/12 |
| 9,120,624 B1 * | 9/2015 | Cassady | G06Q 10/0836 |
| 9,975,651 B1 * | 5/2018 | Eck | B65G 67/04 |
| 10,114,996 B2 * | 10/2018 | Lossov | G07F 17/0014 |
| 10,835,070 B2 * | 11/2020 | Russell | B64D 1/02 |
| 10,888,189 B2 * | 1/2021 | Pointeau | G06Q 10/08 |
| 11,191,382 B2 * | 12/2021 | Likins | A47G 29/1218 |
| 11,633,058 B2 * | 4/2023 | Sun | B64F 1/324 232/43.1 |
| 11,661,276 B2 * | 5/2023 | Chen | B65G 69/26 414/331.05 |
| 12,059,089 B1 * | 8/2024 | Dunn | B64C 39/024 |
| 2013/0264381 A1 * | 10/2013 | Kim | G07F 17/13 232/24 |
| 2016/0257423 A1 * | 9/2016 | Martin | A47G 29/14 |
| 2017/0175413 A1 * | 6/2017 | Curlander | B64U 80/25 |
| 2018/0186454 A1 * | 7/2018 | Luckay | G06Q 10/0836 |
| 2019/0009906 A1 * | 1/2019 | von Gostomski | B64C 39/024 |

(Continued)

Primary Examiner — William L Miller
(74) Attorney, Agent, or Firm — Witters & Associates; Steve Witters

(57) ABSTRACT

A delivery system and a method of delivering articles are provided. The system has a secure box having a planar top wall and a cylindrical sidewall, and a reclosable opening in the top wall, at least one reclosable opening in the sidewall. The system is configured to open the top wall opening for receiving an article into the secure box and for closing and locking the top wall opening, upon the article being received in the secure box. A round conveyor having at least two partitions and is configured and disposed to hold the article and to rotate and dispose the article proximate the sidewall opening for a recipient of the article.

19 Claims, 5 Drawing Sheets

(56) References Cited

U.S. PATENT DOCUMENTS

| | | | |
|---|---|---|---|
| 2019/0152701 A1* | 5/2019 | Eck | B64F 1/368 |
| 2019/0233135 A1* | 8/2019 | Cantrell | B64C 39/024 |
| 2019/0320834 A1* | 10/2019 | Tovey | F24F 11/88 |
| 2020/0172337 A1* | 6/2020 | Wilkinson | B65G 1/06 |
| 2020/0231393 A1* | 7/2020 | Mercado | G06Q 10/0836 |
| 2021/0196069 A1* | 7/2021 | Likins | A47G 29/1218 |
| 2021/0214159 A1* | 7/2021 | Tazume | B65G 1/0435 |
| 2021/0284450 A1* | 9/2021 | Wang | B65G 1/0435 |
| 2021/0284451 A1* | 9/2021 | Burchat | B65G 11/203 |
| 2021/0321810 A1* | 10/2021 | Sun | G07F 11/1653 |
| 2022/0245373 A1* | 8/2022 | Lõssov | G06Q 10/0836 |
| 2023/0331399 A1* | 10/2023 | Aharoni | B65G 65/00 |
| 2023/0363562 A1* | 11/2023 | O'Toole | A47G 29/141 |

* cited by examiner

DELIVERY SYSTEM AND METHOD

CROSS REFERENCE TO RELATED APPLICATIONS

This application claims priority to U.S. provisional application No. 63/220,334, filed Jul. 9, 2021, the disclosures of which is hereby incorporated by reference in its entireties

FIELD OF THE DISCLOSURE

The invention relates to a delivery system, method, and drone landing station for the landing of a drone and the delivery of articles, letters, packages, goods, freight, and the like.

BACKGROUND

Aerial vehicles such as drones may be used to carry or deliver articles, letters, packages, goods, freight, and the like. The use of such drones for delivery may present challenges such as providing designated areas for the take-off, landing, and the secure delivery or holding of articles, letters, packages, goods, freight, and the like. The presently disclosed delivery system, method, and drone landing station or secure box may overcome one or more of the above challenges.

SUMMARY

In accordance with a first broad aspect there is provided, a delivery system comprising: a secure box having a planar top wall and a sidewall; a reclosable opening in the top wall; at least one reclosable opening in the sidewall; the top wall opening being configured and disposed to open and receive an article into the secure box, and to close and lock, upon the article being received in the secure box. The secure lock box has at least one locking sidewall opening configured and disposed to be opened and for the removal of the delivered article.

In at least one embodiment of the present disclosure, a delivery system comprises a secure box having a planar top wall and a cylindrical sidewall; a reclosable opening in the top wall; and at least one reclosable opening in the sidewall. The system is configured and disposed to open the top wall opening for receiving an article into the secure box and for closing and locking the top wall opening, upon the article being received in the secure box. A round conveyor having at least two partitions is configured and disposed to hold the article and to rotate and dispose the article proximate the sidewall opening. The at least one sidewall opening is configured and disposed to be unlocked and opened for the removal of the delivered article from the conveyor and to close and lock, upon the retrieval of the article by a user or recipient of the article.

In another aspect, a method of delivering articles is provided. The method comprises the steps of: moving an article being delivered to a secure box and placing the article on a top wall of the secure box or in a reclosable opening in the top wall, with an aerial drone, and moving the article into the secure box; opening a reclosable opening in a sidewall of the secure box; and removing the article from the secure box by a recipient.

In at least one other embodiment of the present disclosure, a method of delivering articles is provided. The method comprises the steps of: opening a portion of a top wall of a secure box; moving an article being delivered through the opening in the top wall and into the secure box; holding the article on with a round conveyor having partitions extending up from a bottom wall; closing and securing the top portion of the top wall; receiving a communication from a recipient of the article; rotating the round conveyor and disposing the article proximate a sidewall opening in the secure box; opening the sidewall opening and retrieving the article held on the conveyor between the partitions, by the recipient; and closing and securing the opening in the sidewall.

BRIEF DESCRIPTIONS OF THE DRAWINGS

The foregoing and other features of this disclosure will become more fully apparent from the following description and appended claims, taken in conjunction with the accompanying drawings and examples. Understanding that these drawings depict only several embodiments in accordance with the disclosure and are, therefore, not to be considered limiting of its scope, the disclosure will be described with additional specificity and detail through use of the following figures, which are idealized, are not to scale and are intended to be merely illustrative of aspects of the present disclosure and non-limiting. In the drawings, like elements are depicted by like reference numerals. The drawings are briefly described as follows:

DETAILED DESCRIPTION

Figure 1:
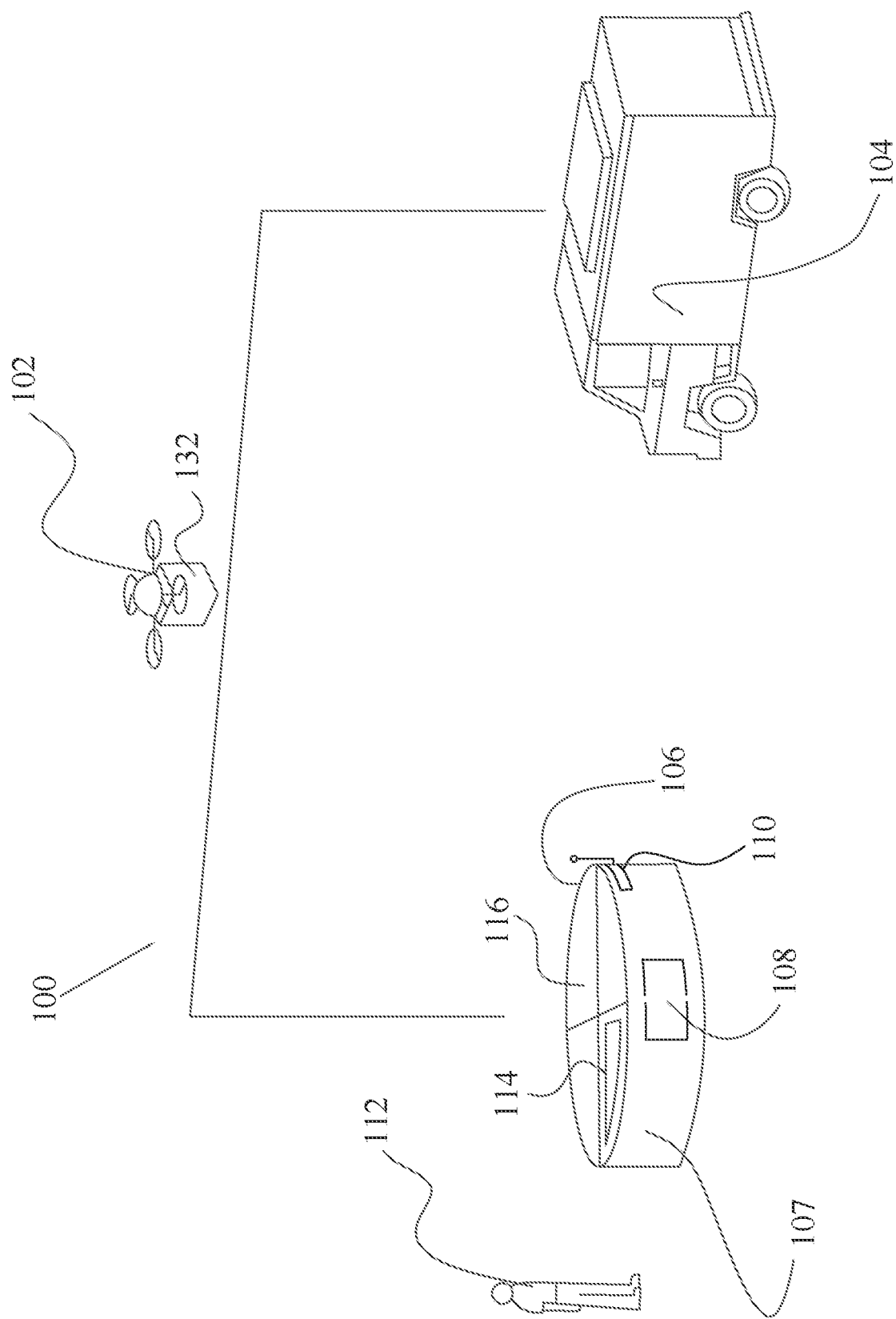
FIG. 1 is an illustrative view of a delivery system of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 shows an illustrative view of a delivery system of the present disclosure having a delivery vehicle, a drone, and a secure box. The delivery vehicle may transport articles, letters, packages, goods, freight, and the like proximate delivery sites or one or more secure boxes. For example, one or more of the delivery sites may have a secure box for the delivery of articles. A drone may make a delivery by moving the articles to be delivered from the delivery vehicle to a secure box.

The delivery vehicle, drone, and/or secure box may have sensors and communication links with one another and/or with the internet. For example, the secure box may communicate to the drone its location for landing. The secure box may sense, or receive a signal from the drone that an article is being, or has been, delivered to the secure box. Upon receiving one or more articles into the secure box, the secure box may communicate to a recipient of the article that an article has been delivered to the secure box. In at least one embodiment of the present disclosure, a delivery system comprises a secure box for the receipt of articles being delivered.

FIG. 1 shows delivery system 100 having secure box 106. Secure box 106 has a planar top wall 116 and a cylindrical sidewall 107. Reclosable opening 114 is disposed in top wall 116 and at least one reclosable opening 108 is in sidewall 107. System 100 is configured and disposed to open top wall opening 114 for receiving an article 132 into secure box 106 and for closing and locking top wall opening 114, upon article 132 being received in secure box 106. A round conveyor having at least two partitions configured and disposed to hold article 132 and to rotate and dispose article 132 proximate sidewall opening 108 may be housed in secure box 106.

At least one sidewall opening 108 may be configured and disposed to be unlocked and opened for the removal of the delivered article 132 from the conveyor and to close and lock, upon the retrieval of article 132 by a user or recipient 112. Delivery system 100 may have aerial drone 102 configured to deliver article 132 to secure box 106. Delivery system 100 may also have delivery vehicle 104 configured to move article 132 to be delivered, or a plurality of the articles 132 to be delivered, and to supply the articles 132 to be delivered to aerial drone 102.

Delivery system 100 may have at least one sensor, communication link, or internet connectivity 110 which may configure delivery system 100 to guide or navigate aerial drone 102 for the delivery of article 132 through reclosable opening 114 in top wall 116 and into secure box 106. Delivery system 100 may be configured to guide or navigate aerial drone 102 for landing on planar top wall 116 of secure box 106. Delivery system 100 may be configured to communicate to recipient 112 of article 132 that article 132 has been delivered to secure box 106.

In at least one embodiment, system 100 is configured to move article 132 proximate at least one opening in a cylindrical sidewall 107 and open opening 108, upon recipient 112 of article 132 inputting or wirelessly sending a code or password to delivery system 100. In at least one other embodiment of the present disclosure, delivery system 100 has aerial drone 102 configured to place article 132 being delivered on top wall 116 of secure box 106, or in an opening 114 in top wall 116.

Figure 2:
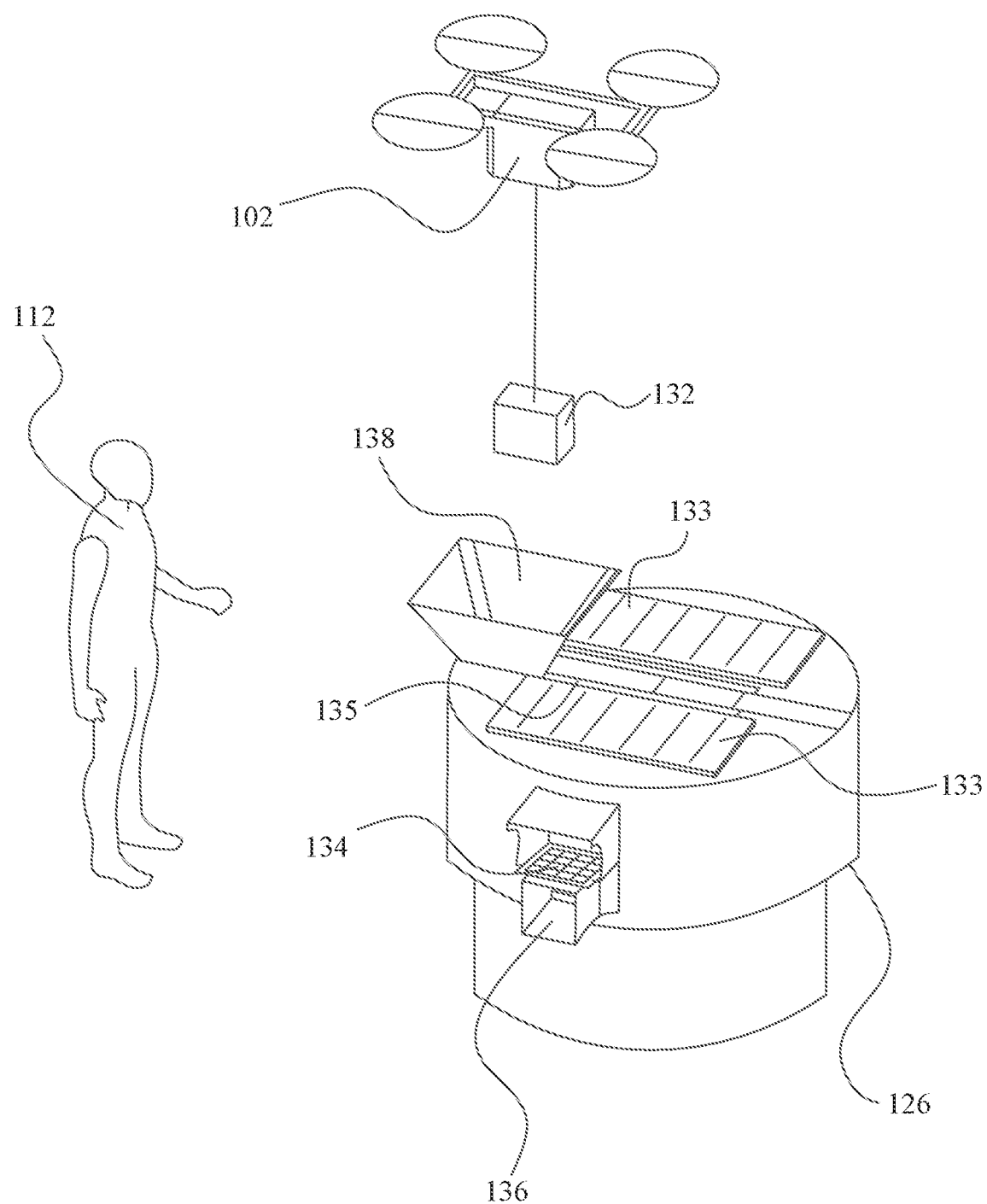
FIGS. 2 and 3 are illustrative views of other embodiments of the delivery system, or portions thereof, of the present disclosure.
Figure 3:
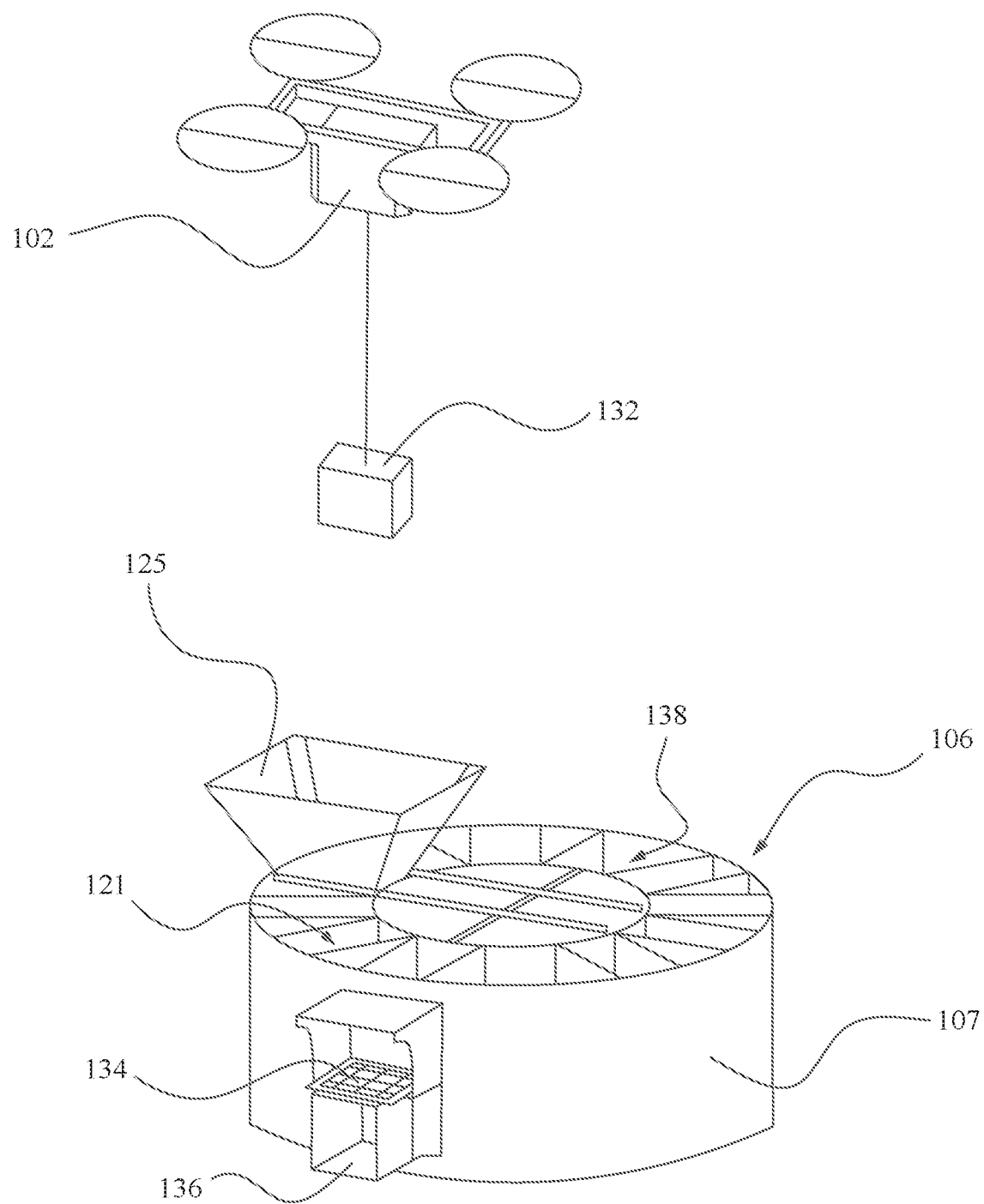

FIGS. 2 and 3 are illustrative views of other embodiments of the delivery system, or portions thereof, of the present disclosure. In at least one embodiment of the delivery system of the present disclosure, solar panels 133 are disposed on top wall 116. An upper chute 125 configured to aid in delivery of articles may be disposed about a top wall opening. Upper chute 125 may aid in the delivery of articles 132 to the secure box, delivery by hand or by drone 102. A user delivery chute 136 may be disposed about a sidewall 107 opening to aid in the delivery of articles to recipient 112. A package delivery computer 134 may be disposed with the secure box 106. Article delivery opening 138 may be disposed in top wall 116.

Figure 4:
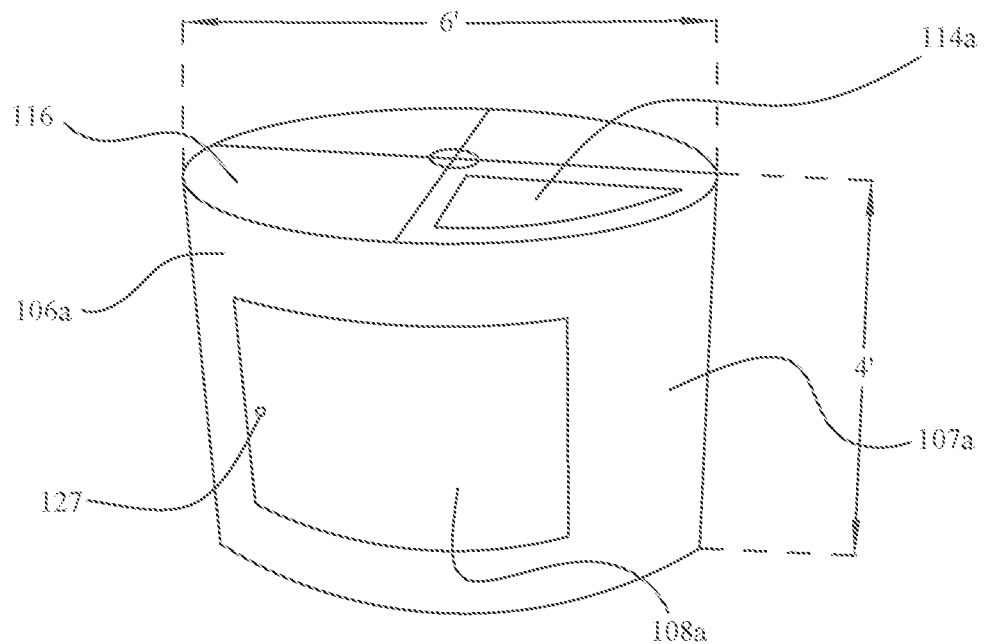
FIG. 4 is an illustrative view of a secure box of the present disclosure.

FIG. 4 shows an illustrative view of secure box 106a of the present disclosure. Secure box 106a has planar top wall 116 and sidewall 107a. For example, secure box 106a may be configured for the landing of drone 102 and/or the receipt of article 132 being delivered. In at least one embodiment, secure box 106a has a circular top wall 116.

Secure box 106a may have at least one reclosable opening 114a in top wall 116. Top wall opening 114a may be configured and disposed to open and receive article 132 into secure box 106a, upon the article being delivered to secure box 106a, and close, upon article 132 being received in secure box 106a. The reclosable opening 114a may be configured to receive articles 132 being delivered. For example, secure box 106a, or system 100, may sense the delivery of article 132, or receive communication from drone 102 or delivery vehicle 104, that an article 132 is being moved to the secure box. Opening 114a in top wall 116 may be opened to receive article 132 directly from drone 102 or secure box 106a may be configured to move article 132 into opening 114a, upon article 132 being placed on top wall 116 by drone 102.

Secure box 106a may have one or more sidewall openings 108a configured and disposed to be opened and for the removal of delivered article 132. In at least one embodiment, secure box 106a has a lock configured and disposed for securing reclosable opening 108a, in sidewall 107a, closed and securing article 132 in secure box 106a. For example, the recipient of article 132 may have a key or electronic code for the opening of sidewall opening 108a. Secure box 106a may be configured to receive an electronic code wirelessly from recipient 112. For example, a portable electronic device, such as a smart phone, may be used by recipient 112 to receive their delivery. Upon opening sidewall 107a, recipient 112 may retrieve their delivered articles 132 from the secure box 106a.

Top wall 116 of secure box 106a may be circular. However, other configurations such as rectangular, square, angular, or rounded may provide a surface for the receipt of articles 132 being delivered and/or the landing of drone 102 and for the securing of delivered articles 132 therein.

In at least one embodiment, secure box 106a is cylindrical. One or more circular platforms or conveyors may be housed in secure box 106a. The circular platform may hold articles to be delivered and may be rotated to move the articles to sidewall opening 108a for retrieval by recipient 112. For example, upon recipient 112 entering a code to secure box 106a, either manually or wirelessly, the platform may rotate their articles 132 proximate sidewall opening 108a and sidewall 107a may be opened for retrieval, by the intended recipient 112, and final delivery of the articles 132 may be made.

Figure 5:
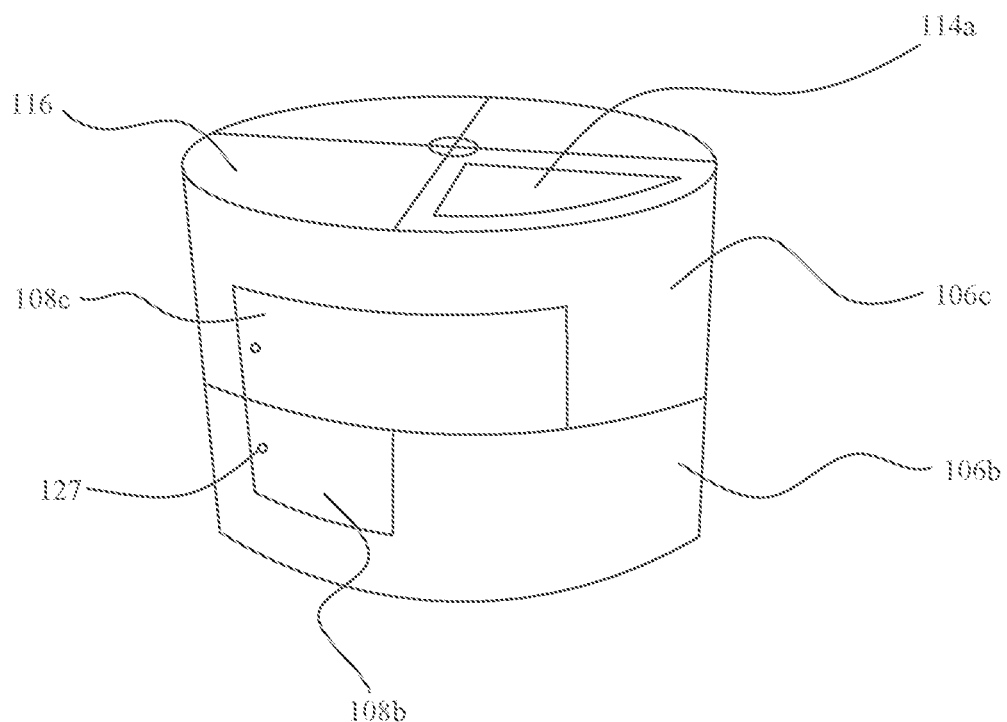
FIG. 5 is an illustrative view of another embodiment of the secure box of the present disclosure.

FIG. 5 is an illustrative view of another embodiment of the secure box of the present disclosure. The secure box of the present disclosure may be modular wherein two or more secure boxes may be stacked one upon the other. For example, secure box 106c may be disposed on secure box 106b to provide a secure box having an upper level and a lower level. In at least one embodiment, the secure box of the present disclosure has a first conveyor and a second conveyor, the first conveyor is disposed on top of the second conveyor and has a bottom wall with an opening configured and disposed to pass the delivered article therethough and to the second conveyor. Upper secure box 106c may dispose upper sidewall opening 108c and lower secure box 106b may dispose lower sidewall opening 108b, for the retrieval of articles 132 from an upper conveyor or a lower conveyor.

Figure 6:
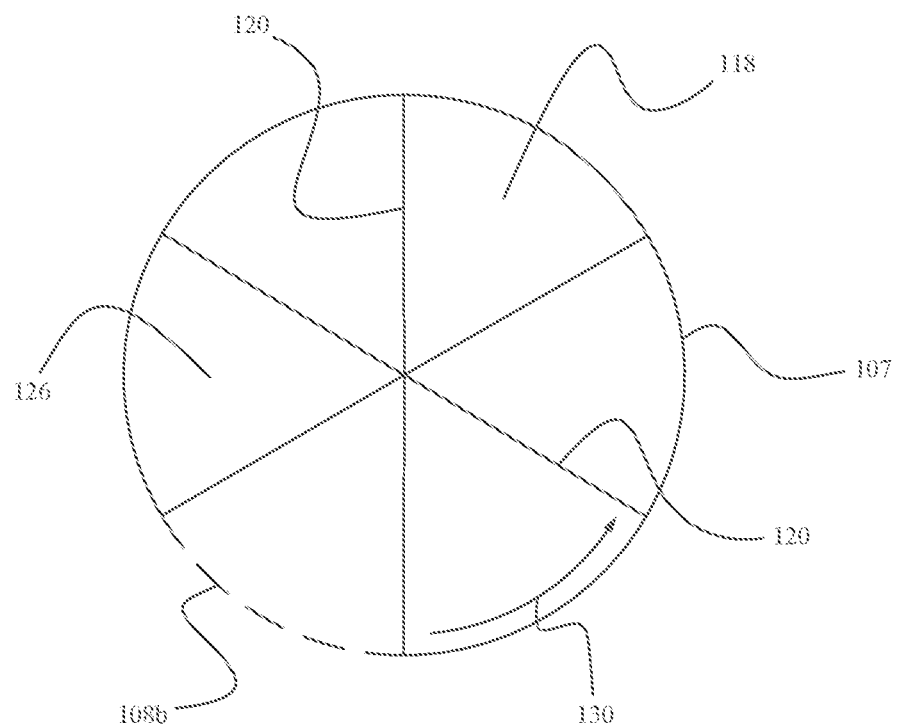
FIG. 6 shows an illustrative view of an article moving system or conveyor that may be placed in the secure box shown in FIGS. 4 and 5.

FIG. 6 shows an illustrative view of an illustrative article moving system or conveyor 118 that may be placed in secure boxes 106, 106a, and 106b. As shown in FIG. 6, conveyor 118 may have dividers or partitions 120 configured to isolate articles 132 contained in the secure box for each intended recipient 112. For example, an intended recipient 112 may have access to only the articles 132 that are placed in an isolated area of conveyor 118 for delivery to the intended recipient 112.

In at least one embodiment, secure box 106, 106a, and/or 106b has conveyor 118. For example, the secure box of the present disclosure may have a first conveyor and a second conveyor, the first conveyor is disposed on top of the second conveyor. The lower conveyor may have a bottom wall 126 void of openings to hold all articles 132 placed thereon.

In at least one embodiment, conveyor 118 is round and has at least two partitions 120 and is configured and disposed to hold articles 132 and to rotate, as shown with rotation arrow 130, and dispose article 132 proximate sidewall opening 108b. Conveyor 118 may have three or more partitions 120. One or more partitions 120 may be substantially equally angularly spaced about the round conveyor bottom wall 126.

Figure 7:
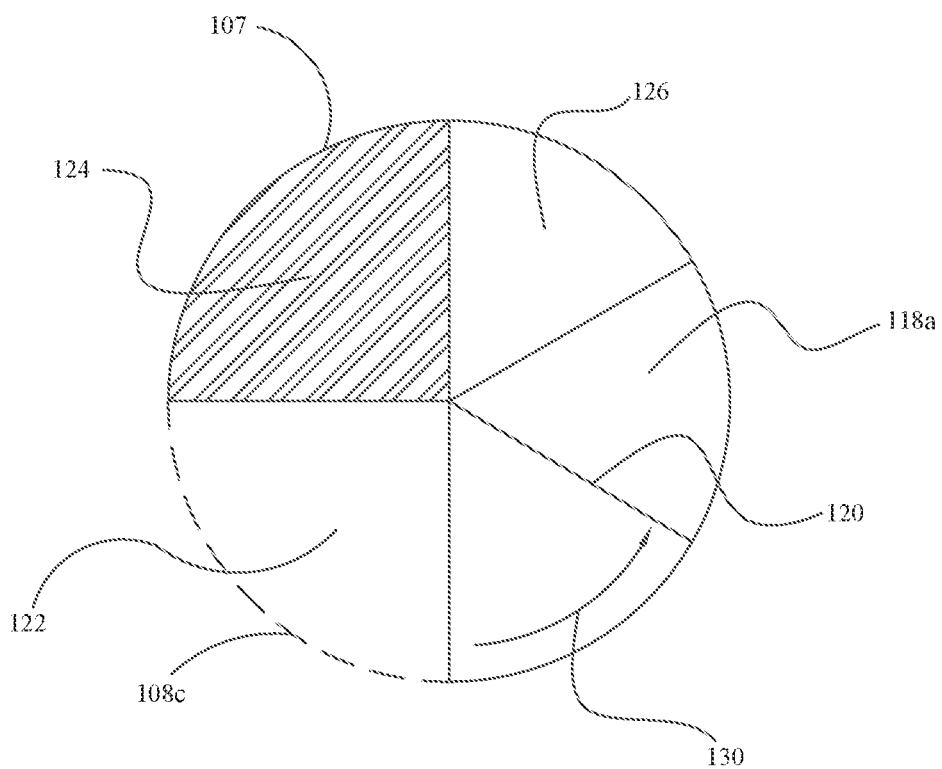
FIG. 7 shows an illustrative view of an article moving system or conveyor that may be placed in the upper level of the secure box shown in FIG. 5.

FIG. 7 shows article moving system or conveyor 118a that may be placed in secure box 106, 106b, or the upper level of a secure box, such as secure box 106c, shown in FIG. 5. For example, conveyor 118a may be a round conveyor having at least two partitions 120 and configured and disposed to hold article 132 on bottom wall 126 and to rotate, as designated with rotation arrow 130, and dispose article 132 proximate sidewall opening 108c.

In at least one embodiment, at least one of the partitions 120 is angularly spaced differently, about round conveyor 118a, than the other of the at least three partitions 120, configuring the conveyor to receive and hold articles 132 of different sizes. Conveyor 118a may be disposed above one or more conveyors in a modular fashion and may have bottom wall 126 with an opening 124 configured and disposed to pass delivered articles 132 therethough and to a lower conveyor.

In at least one embodiment, secure box 106, 106a, and/or 106b has conveyor 118. For example, the secure box of the present disclosure may have a first conveyor and a second conveyor, the first conveyor is disposed on top of the second conveyor and has a bottom wall with an opening configured and disposed to pass the delivered article therethough and to the second conveyor.

In at least one embodiment of the delivery system of the present disclosure, solar panels 133 are disposed on top wall 116. An upper chute 125 configured to aid in delivery of articles may be disposed about a top wall opening. Upper chute 125 may aid in the delivery of articles 132 to the secure box, delivery by hand or by drone 102. Article delivery opening 138 may be disposed in top wall 116. Sliding rails 135 may be disposed with the chute. A user delivery chute 136 may be disposed about a sidewall 107 opening to aid in the delivery of articles to recipient 112. A package delivery computer 134 may be disposed with the secure box 106. Partitions 120 may be disposed with the conveyor or carousel. Compartments 121 may be formed with partitions 120 or otherwise provided.

The presently disclosed delivery system may have a delivery vehicle configured move an article to be delivered, or a plurality of articles to be delivered, and to supply the article(s) to be delivered to an aerial drone.

Presently disclosed is a method of delivering articles comprising the steps of: moving an article being delivered to a secure box and placing the article on a top wall, or in a reclosable opening therein, of the secure box, with an aerial drone; moving the article into the secure box and securing the article therein; opening a reclosable opening in a sidewall of the secure box; and removing the article from the secure box by an intended recipient of the article.

The method may also include moving a plurality of articles to be delivered to one or more recipients to within a range of a delivery drone to one or more secure boxes. For example, a delivery vehicle may stop within a delivery range wherein a delivery drone may move articles to one or more secure boxes.

In at least one embodiment, a method of delivering articles comprises opening a portion of a top wall of a secure box; moving an article being delivered through the opening in the top wall and into the secure box; holding the article on with a round conveyor having partitions extending up from a bottom wall; closing and securing the top portion of the top wall; receiving a communication from a recipient of the article; rotating the round conveyor and disposing the article proximate a sidewall opening in the secure box; opening the sidewall opening and retrieving the article held on the conveyor between the partitions, by the recipient; and closing and securing the opening in the sidewall.

The method may further comprise moving a first article having a first size and a second article having a second size through the opening in the top wall and holding the first article between a pair of partitions having a first space therebetween and holding the second article between a pair of partitions having a second space therebetween, the first size being different than the second size and the first space being different than the second space.

The method may also comprise passing the article through an opening in the conveyor and moving the article to a lower conveyor, the step of rotating the round conveyor may comprise rotating the lower conveyor and the step of opening the sidewall may comprise opening a lower sidewall opening.

The method may further comprise moving and delivering the article to the secure box with an aerial drone. In at least one embodiment, a plurality of articles may be moved proximate the secure box with a vehicle for supplying the articles to the aerial drone for moving to the secure box.

The method may comprise sensing or communicating at least one parameter and guiding or navigating the aerial drone for delivering the article through the reclosable opening in the top wall and into the secure box. In at least one embodiment, the method comprises communicating to a recipient of the article that the article has been delivered to the secure box.

The presently disclosed delivery system may incorporate, or include, wireless communication devices or capabilities, such as smartphones, portable computers, tablets, etc. For example, wireless communications systems such as (3G) carrier networks, fourth generation (4G) carrier networks, WiFi local area networks (LANs), Bluetooth, etc., may be used for communication between components of the presently disclosed delivery system and optionally the internet or cloud. For example, a drone or delivery vehicle may communicate to a secure box that a delivery to the secure box may be arriving. Upon receiving this communication, the secure box may automatically prepare for the receipt of the articles being delivered. For example, the secure box may send a signal to notify the drone of a precise landing or drop location and prepare to receive the articles. The secure box may open a portion of a top wall for receipt of the delivery and/or may position an area or volume for the receipt of the article(s) for an intended recipient. For example, a partitioned section of the secure box may be moved into position to receive the article(s) being delivered to the recipient. The identity of the intended recipient may be communicated to the secure box with the drone, delivery vehicle, or other portion of the system which may reside in the cloud. Upon receipt of articles into the secure box, a notification may be sent to the intended recipient via the internet or email, or other wireless communication system. It is to be understood that one or more of the delivery vehicle, drone, and secure box may be configured to electronically communicate with the internet, intended recipient, each other and/or other aspects of the delivery system. For example, the secure box may be configured to communicate with a drone, delivery vehicle, intended recipient(s), or a remote controller via the internet. The remote controller of the system may reside in the cloud.

While specific examples of the invention have been described, it will be understood that the invention extends to alternative combinations of the features disclosed or evident from the disclosure provided herein.

Many and various modifications will be apparent to those skilled in the art without departing from the scope of the invention disclosed or evident from the disclosure provided herein.

NOMENCLATURE delivery system 100
aerial vehicle or drone 102
delivery vehicle 104
secure box 106, 106a, 106b, 106c
sidewall 107. 107a
reclosable sidewall opening 108, 108a, 108b, 108c
wireless connectivity or electronic input device 110
recipient of article 112
reclosable top wall opening 114, 114a
planar top 116
conveyor or carousel 118, 118a
partition 120
compartment 121
large article or package area 122
open bottom or chute 124
upper chute 125
bottom wall 126
key lock or keypad 127
rotation 130
article 132
solar panels 133
package delivery computer 134
sliding rails for chute 135
user delivery chute 136
article delivery opening 138

The invention claimed is:

1. A delivery system comprising:
a secure box having a planar top wall and a cylindrical sidewall;
a reclosable opening in the top wall;
a top wall door configured and disposed to close the reclosable opening in the top wall;
a top wall lock configured and disposed for locking the top wall door closed;
at least one reclosable opening in the sidewall;
a sidewall door configured and disposed to close the reclosable opening in the sidewall;
a sidewall lock configured and disposed for locking the sidewall door closed;
the system being configured and disposed to move the top wall door and open the top wall opening for receiving an article into the secure box and for moving the top wall door and closing the top wall opening, and for activating top wall lock and locking the top wall door closed, upon the article being received in the secure box;
at least one round conveyor having at least two partitions and being configured and disposed to hold the article and to rotate and dispose the article proximate the sidewall opening;
the at least one sidewall opening being configured and disposed to be unlocked and opened for the removal of the delivered article from the at least one round conveyor and to close and lock upon the retrieval of the article by a user.

2. The delivery system of claim 1, wherein the at least one round conveyor comprises a first conveyor and a second conveyor, the first conveyor is disposed on top of the second conveyor and has a bottom wall with an opening configured and disposed to pass the delivered article therethough and to the second conveyor.

3. The delivery system of claim 1, wherein the at least one round conveyor has at least three said partitions.

4. The delivery system of claim 3, wherein the at least three partitions are substantially equally angularly spaced about the at least one round conveyor.

5. The delivery system of claim 3, wherein at least one of the partitions is angularly spaced differently, about the at least one round conveyor, than the other of the at least three partitions, configuring the at least one round conveyor to receive and hold articles of different sizes.

6. The delivery system of claim 1 further comprising an aerial drone configured to deliver the article to the secure box.

7. The delivery system of claim 6 further comprising a delivery vehicle configured to move the article to be delivered, or a plurality of the articles to be delivered, and to supply the articles to be delivered to the aerial drone.

8. The delivery system of claim 6 further comprising at least one sensor, communication link, or internet connectivity.

9. The delivery system of claim 6 further comprising a sensor and being configured to guide or navigate the aerial drone, with the sensor, for the delivery of the article through the reclosable opening in the top wall and into the secure box.

10. The delivery system of claim 6 further comprising a sensor and being configured to guide or navigate the aerial drone, with the sensor, for landing on the planar wall of the secure box.

11. The delivery system of claim 6 further comprising a communication link or internet connectivity and being configured to communicate to a recipient of the article, with the communication link or the internet connectivity, that the article has been delivered to the secure box.

12. The delivery system of claim 1 further comprising wireless connectivity or an electronic input device and being configured to move the article proximate the at least one opening in the sidewall and open the opening, upon a recipient of the article inputting or wirelessly sending a code or password to the delivery system with the wireless connectivity or the electronic input device.

13. A method of delivering articles comprising the steps of:
opening a portion of a top wall of a secure box;

moving an article being delivered through the opening in the top wall and into the secure box;

holding the article with at least one round conveyor having partitions extending up from a bottom wall;

closing and securing the top portion of the top wall;

receiving a communication from a recipient of the article;

rotating the at least one round conveyor and disposing the article proximate a sidewall opening in the secure box;

opening the sidewall opening and retrieving the article held on the at least one round conveyor between the partitions, by the recipient;

and closing and securing the opening in the sidewall.

14. The method of claim 13 further comprising moving a first article having a first size and a second article having a second size through the opening in the top wall and holding the first article between a pair of said partitions having a first space therebetween and holding the second article between a pair of said partitions having a second space therebetween, the first size being different than the second size and the first space being different than the second space.

15. The method of claim 13 comprising passing the article through an opening in an upper said at least one round conveyor and moving the article to a lower said at least one round conveyor, the step of rotating the at least one round conveyor comprises rotating the lower round conveyor and the step of opening the sidewall opening comprises opening a lower sidewall opening.

16. The method of claim 13 comprising moving and delivering the article to the secure box with an aerial drone.

17. The method of claim 16 comprising moving a plurality of articles with a vehicle proximate the secure box and supplying the articles to the aerial drone for moving to the secure box.

18. The method of claim 17 comprising sensing or communicating at least one parameter and guiding or navigating the aerial drone for delivering the article through the reclosable opening in the top wall and into the secure box.

19. The method of claim 13 comprising communicating to a recipient of the article that the article has been delivered to the secure box.

\* \* \* \* \*